(12) United States Patent
Shea et al.

(10) Patent No.: US 10,936,541 B2
(45) Date of Patent: Mar. 2, 2021

(54) PRESERVING SYMBOLIC LINKS AND PATHS IN A FILE SYSTEM USING AN INTERMEDIATE FILE SYSTEM STRUCTURE

(71) Applicant: Red Hat, Inc., Raleigh, NC (US)

(72) Inventors: David Alan Shea, Boston, MA (US); David Lawrence Cantrell, Jr., Medford, MA (US)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 16/116,733

(22) Filed: Aug. 29, 2018

(65) Prior Publication Data

US 2020/0073957 A1 Mar. 5, 2020

(51) Int. Cl.
*G06F 16/13* (2019.01)
*G06F 16/11* (2019.01)
*G06F 16/16* (2019.01)

(52) U.S. Cl.
CPC ........... *G06F 16/13* (2019.01); *G06F 16/119* (2019.01); *G06F 16/166* (2019.01)

(58) Field of Classification Search
CPC ....... G06F 16/13; G06F 16/166; G06F 16/119
See application file for complete search history.

(56) References Cited

U.S. PATENT DOCUMENTS

| 5,832,527 A | 11/1998 | Kawaguchi |
| 6,321,219 B1 | 11/2001 | Gainer et al. |
| 2009/0216811 A1* | 8/2009 | Manczak ............... G06F 16/188 |
| 2015/0227550 A1* | 8/2015 | Matsuki .................. G06F 12/00 707/827 |
| 2018/0189088 A1* | 7/2018 | Chen .......................... G06F 8/61 |

\* cited by examiner

*Primary Examiner* — Jay A Morrison
(74) *Attorney, Agent, or Firm* — Lowenstein Sandler LLP

(57) ABSTRACT

A method includes identifying data objects for a file system to be installed on a computer system. Each of the data objects is to be stored in the file system using a respective path. The method also includes creating an intermediate file system structure that includes elements representing the data objects to be stored in the file system, each of the elements being placed in the intermediate file system structure at the respective path. Creating the intermediate file system structure may include identifying a subset of the data objects that each includes a symbolic link in a portion of the respective path, and for each data object in the subset, replacing the symbolic link in the portion of the respective path with a target path associated with the symbolic link. The method also includes installing the file system on the computer system using the intermediate file system structure.

20 Claims, 10 Drawing Sheets

PRESERVING SYMBOLIC LINKS AND PATHS IN A FILE SYSTEM USING AN INTERMEDIATE FILE SYSTEM STRUCTURE

TECHNICAL FIELD

The present disclosure is generally related to file system structures in a computing environment, and more particularly, to preserving symbolic links and paths in a file system using an intermediate file system structure.

BACKGROUND

A system image can refer to an exact copy of content (settings, programs, and/or data objects) associated with the system that are stored at a memory device. The system image may be distributed to other computing systems to set up those computing systems with the system image or may be used as a backup in case the current computer system becomes corrupted, for example. Installing the system image may cause a file system to be installed in non-volatile memory of a computing system. A file system may refer to the structure and logic rules used to manage data objects. Data objects may refer to directories and/or files. A file may refer to a data object that stores data, and a directory may refer to a data object that stores files and/or other directories. In some instances, the file system may store symbolic links, which may refer to a file that includes a mapping from the symbolic link (e.g., file or directory in the file system) to a target path (e.g., a different file or directory in the file system).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
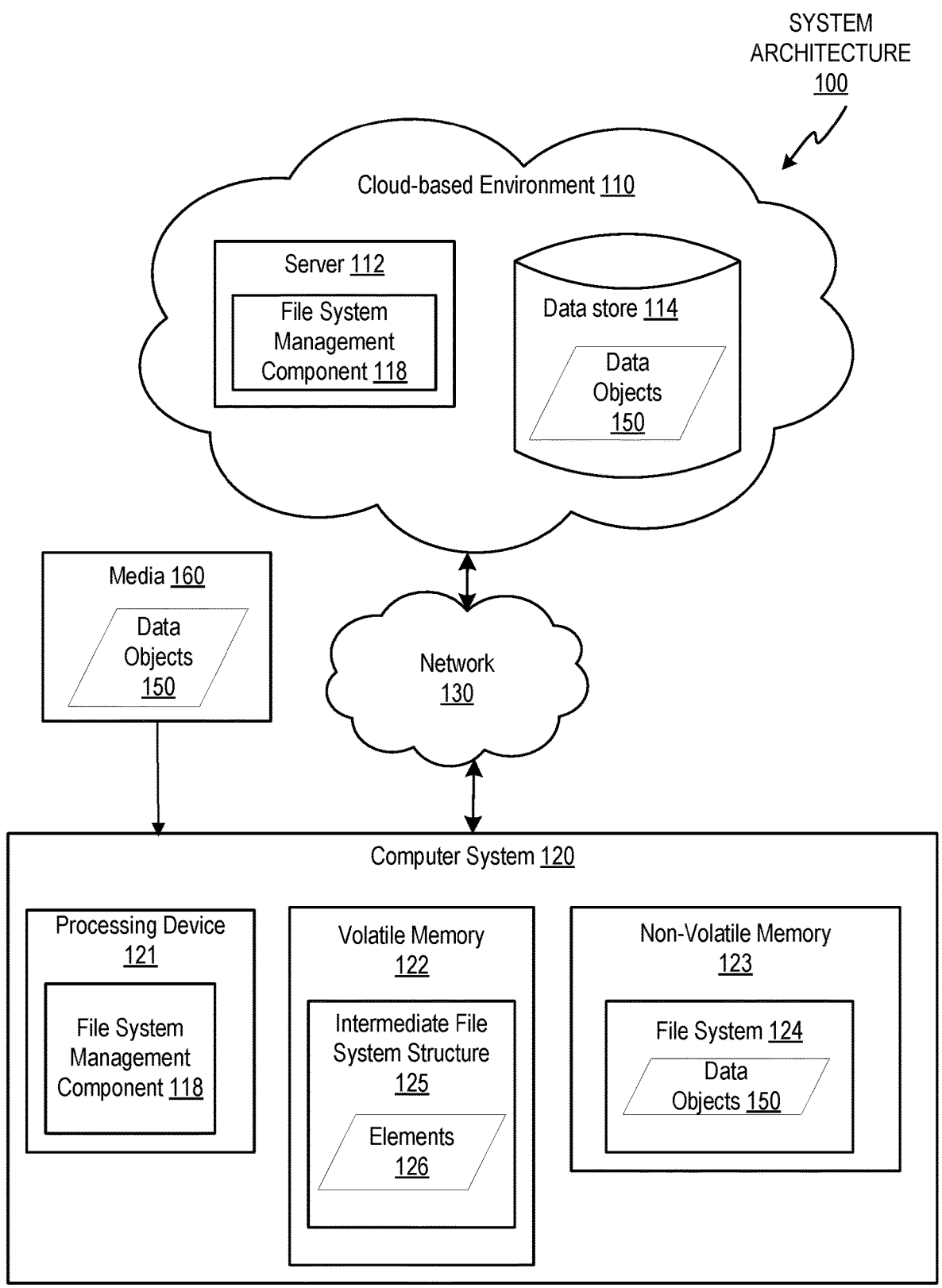
FIG. 1 depicts a high-level block diagram of a system architecture that uses an intermediate file system structure to install and manage a file system, in accordance with one or more aspects of the present disclosure.

Multiple sets of content (e.g., packages, archives, payloads) may be used to install a file system. Each set of content may include multiple data objects (e.g., directories, files, etc.) that are each associated with various metadata (e.g., size, type, path). The sets of content may have any suitable type that is capable of delivering system content, such as a tape archive (tar) file, a zip file, a Red Hat® Package Manager (RPM) file, etc. The file system may have a structure including numerous data objects (e.g., directories and files). The format of the file system may be any suitable type capable of organizing the data objects, such as a container image, an OSTree repository, etc.

The file system may be responsible for managing access to content of files and/or metadata about the files, as well as directory operations, and security and protection of the files and directories. The file system may interact with memory device drivers or channels to operate the memory device. Also, the file system may organize the data objects and keep track of which areas of a memory device are occupied or available. The file system may use a tree hierarchy to organize the directories and files using respective paths.

For example, each data object stored in a file system may have a respective path that represents a unique location in the file system. A path may point to a file system location by following the tree hierarchy expressed in a string of characters in which portions (e.g., path elements) of the path are separated by a delimiting character (e.g., a slash "/"). For example, a file named "sh" stored in a directory named "bin" may be have the following path: "/bin/sh".

Symbolic links may be used by a file system as aliases (e.g., shortcuts) for the files and/or directories located at respective paths. A symbolic link may refer to a file (also referred to as a symbolic link file herein) that contains a reference to another file or directory in the form of an absolute or relative path. A file that does not include a reference to another file or directory may be referred to as a non-symbolic link file herein. The symbolic link may contain a text string that includes a location path (e.g., "bin") of the symbolic link mapped to a target (e.g., file or directory) at a target path (e.g., "/usr/bin") and an indicator that the file is a symbolic link. The symbolic link may not contain the data of the target. Any file system management commands may be used on the symbolic link to affect the contents and/or the metadata of the target (e.g., read or write commands may access the contents of the target at the target path).

Further, symbolic links may alter the paths of data objects when the data objects are added to a file system. For example, a file system may include a symbolic link "/bin" that is pointing to a target path "/usr/bin". Writing a non-symbolic link file with path "/bin/sh", where a portion ("/bin") of the path includes the symbolic link "/bin", to the file system will create a file at the target path ("/usr/bin")

instead of "/bin" based on the symbolic link. Thus, if a first set of content does not use a symbolic link to store data objects and a second set of content uses a symbolic link to store data objects, then the two sets of content may include inconsistent paths for data objects. In conventional systems, if the two sets of content are being installed for a file system, the path inconsistencies may be unresolvable and may result in the file system structure failing to install.

To further illustrate, if a first set of content does not include a symbolic link and includes a non-symbolic link file at path "/bin/sh", then installing the non-symbolic link file may create a directory "/bin" in a file system and the file "sh" may be stored at that directory. If a second set of content includes a symbolic link "/bin" mapped to target path "/usr/bin" (also denoted to as "/bin→/usr/bin"), then installing the symbolic link may attempt to replace the "/bin" directory with the "/bin" symbolic link but may fail because the "/bin" directory is storing the "sh" non-symbolic link file in the file system already. Thus, in some conventional systems, the sets of content that use symbolic links may be installed prior to installing the sets of content that do not use the symbolic links. Identifying and ordering the installation of numerous (e.g., hundreds, thousands, etc.) data objects is cumbersome and prone to failure. In some instances, depending on the format of the file system, it may not be possible to install a data object having a path that is associated with a symbolic link stored in the file system.

Aspects of the present disclosure address the above and other deficiencies by providing technology that enables installing a file system that preserves symbolic links and paths using an intermediate file system structure. The inconsistencies between sets of content may be removed regardless of the order in which the sets of content are processed during installation of the file system. In some embodiments, before installing a file system, a preprocessing operation may be performed to obtain all the sets of content (e.g., data objects) and create the intermediate file system structure based on the sets of content. The intermediate file system structure may be stored in memory (e.g., random access memory (RAM)) and may be any suitable format (e.g., a tree, linked list) that enables moving elements of the intermediate file system structure in response to identifying symbolic links.

The intermediate file system structure may include elements (e.g., nodes) that represent the various data objects at their respective paths. As data objects are added to the intermediate file system structure, an identification of data objects that each include a symbolic link in a portion of their respective path can be made. The portion of the respective path for each data object that is identified may be replaced by a target path associated with the symbolic link. For example, an element representing a data object having a symbolic link "/bin" as a path may be included in the intermediate file system structure, and the symbolic link may be mapped to a target path "/usr/bin". Adding a non-symbolic link file "sh" at path "/bin/sh" may cause the portion "/bin" to be replaced with the target path "/usr/bin" of the symbolic link because the portion "/bin" of the path of the data object being added includes the symbolic link "/bin". After replacing the portion "/bin" with target path "/usr/bin", an element representing the non-symbolic link file "sh" having the new path "/usr/bin/sh" including the target path can be added to the intermediate file system structure.

Further, during the processing of the sets of content, a data object may be identified to be stored in the file system. The data object (e.g., symbolic link file) may include a symbolic link as a path, and the symbolic link may point to a target path. A determination may be made that an element at the path is already included in an intermediate file system structure associated with the file system, and the element is associated with one or more children elements. For example, an element representing a directory (e.g., "/bin") may have been added by a first set of content that did not use a symbolic link and one or more children elements representing files (e.g., "/sh") or other directories may be associated with the element.

Instead of throwing an error due to a conflict, like conventional systems, embodiments disclosed herein may move the one or more children elements of the element to the target path associated with the symbolic link in the intermediate file system structure. For example, if a file "sh" is already included in the intermediate file system structure at path "/bin/sh", and the symbolic link "/bin" that is mapped to a target path "/usr/bin" is to be added, the file "sh" may be moved to the target path "/usr/bin" and the symbolic link "/bin" is added as the element to the intermediate file system structure by mapping "/bin" to "/usr/bin". Accordingly, the ordering of installing the sets of content does not matter because the elements of the intermediate file system structure are allowed to move around to accommodate new data objects (e.g., non-symbolic link files, directories, symbolic link files, etc.).

Also, in some embodiments, once the intermediate file system structure is created, the file system may be installed based on the intermediate file system structure. Requests may be received to perform operations on the data objects of the file system. The intermediate file system structure may be used to determine whether any paths associated with the data objects of the operations need to be updated. Additionally, the intermediate data structure may be updated any time a new data object is to be stored at the file system. For example, if the data object to be stored has a portion of a path including a symbolic link pointing to a target path, the portion can be substituted with the target path, and a new element representing the data object can be added to the intermediate file system structure at the path including the target path.

Further, in some embodiments, the intermediate file system structure may be used to determine whether data objects include inconsistent paths due to the use of a symbolic link. If an inconsistency is found, a notification can be provided indicating the inconsistency and that the inconsistency can be resolved by performing a corrective action. The corrective action may include substituting a portion of a respective path of the data objects with a target path associated with the symbolic link. Also, the corrective action may include moving any children elements of one or more elements in the intermediate file system structure that are to be replaced by the symbolic link to the target path in the intermediate file system structure.

Some advantages of the disclosed embodiments include using an intermediate file system structure to remove inconsistencies between various paths of data objects included in sets of content prior to installing a file system. Further, the techniques can install a file system with data objects having consistent paths and lacking conflicts without arranging the order of storing the various data objects in the file system. By creating the intermediate file system structure prior to installing the file system, the intermediate file system structure may be used as a template or guide for storing data objects to the file system to ensure that the installation of the file system succeeds. Performance of a computer system may be enhanced by reducing the chance of failure while installing the file system. Further, using the intermediate file system structure to handle data object operations after the file system is installed may also improve the performance of the computer system by reducing the chance of failure during data operations by maintaining consistent paths between data objects while preserving the symbolic links. The disclosed embodiments may apply to any suitable input format and may be used to output any suitable file system format.

Various aspects of the above referenced methods and systems are described in details herein below by way of examples, rather than by way of limitation. The examples provided below discuss a virtualized computer system where the user space processes are managed by aspects of a virtual machine, a hypervisor, a host operating system, or a combination thereof. In other examples, the user space processes are managed by a computing system that uses other forms of virtualization (e.g., operating-system-level virtualization) and may be absent the hypervisor discussed below.

FIG. 1 depicts an illustrative architecture of elements of a system architecture 100 for implementations of the present disclosure. The system architecture 100 includes a cloud-based environment 110 connected to a computer system 120A via a network 130. A cloud-based environment 110 refers to a collection of physical machines that host applications providing one or more services to multiple computer systems 120 via a network 130. The network 130 may be public networks (e.g., the Internet), private networks (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, network 130 may include a wired infrastructure (e.g., Ethernet).

The cloud-based environment 110 may include one or more servers 112 and a data store 114. The data store 114 may be separate from the server 112 and communicatively coupled to the server 112 or the data store 114 may be part of the server 112. In some embodiments, the data store 114 may be included as part of the computer system 120. The data store 114 may store various data objects 150. Numerous data objects 150 may be included in different sets of content, such as archives, packages, or payloads. The data objects 150 may be associated with file system content and may be non-symbolic link files (e.g., including binary, source code, data, etc.), symbolic link files, and/or directories. The data objects 150 may each have a specific path at which each data object 150 is located in a file system. The sets of content including the data objects 150 may be distributed to other servers 112 within the cloud-based environment 110 or to the computer system 120 to set up the respective servers 112 or the computer system 120 with the file system by storing the data objects 150 at their paths. Additionally or alternatively, when the server 112 or the computer system 120 performs undesirably (e.g., becomes corrupted, performance degrades, etc.) the data objects 150 may be used to restore the server 112 or the computer system 120 to a previous state represented by the data objects 150.

The server 112 may be physical machines (e.g., server machines, desktop computers, etc.) that each include one or more processing devices communicatively coupled to memory devices and input/output (I/O) devices. The server 112 may implement a file system management component 118. The file system management component 118 may be implemented as computer instructions that are executable by one or more processing devices on the server 112. In some implementations, the file system management component 118 may be installed on the computer system 120 (e.g., as a standalone application) and operate as peers in a peer-to-peer environment. In some implementations, applications on the computer system 118 may interact with the file system management component 118 and may perform some of the functionality of the file system management component 118.

The computer system 120 may include one or more processing devices 121 communicatively coupled to memory devices (e.g., volatile memory 122 and non-volatile memory 123) and I/O devices. The non-volatile memory 122 may be random access memory (RAM)), and the non-volatile memory 123 may be read-only memory (ROM) or electrically-erasable programmable ROM (EEPROM), for example. The computer system 120 may be a desktop computer, server, laptop computer, tablet computer, mobile phone (e.g., smartphones), or any suitable computer system. In one example, computer system 100 may be a computer system implemented with x86 hardware. In another example, computer system 100 may be a computer system implemented with POWER, ARMv7, ARMv8-A, z/Architecture processor architectures, or other hardware, or a combination thereof. The file system management component 118 may be implemented as computer instructions that reside in the processing device 121 during execution, and/or within the volatile memory 122 or the non-volatile memory 123.

The file system management component 118 may identify multiple data objects 150 for a file system 124 to be installed on the computer system 120 or one of the servers 112 and may create an intermediate file system structure 125 that preserves symbolic links and paths of the data objects 150. As depicted, the data objects 150 may be identified by the file system management component 118 by receiving the data objects 150 from the cloud-based environment 110 or from any other suitable source (e.g., media 160 (jump drive, disk, etc.)). The intermediate file system structure 125 may be created as any suitable data structure (e.g., tree, linked list, graph) that is capable of moving elements 126 in response to identifying symbolic links. The elements 126 (also referred to as nodes herein) may represent the various data objects (e.g., files, directories, etc.) and may be linked in an order that reflects their location at respective paths in a hierarchy of the file system 124. In some embodiments, the intermediate file system structure 125 may be stored in volatile memory 122.

In some embodiments, a new data object 150 (e.g., non-symbolic link file or directory) may be identified to be added to the file system 124, and a portion of the path of the data object may be identified as including a symbolic link. The symbolic link may be replaced in the portion of the path with a target path associated with the symbolic link. An element representing the new data object may be added to the intermediate file system structure at the path including the target path. As such, the symbolic links in the portions of the paths of the data objects being added may be resolved to the target path to maintain the symbolic link and consistency of data object locations being stored in the file system 124.

Further, in some embodiments, a new data object 150 (e.g., symbolic link file) is to be added to the file system 124, and a path of the new data object may be identified as being a symbolic link. A determination may be made that an element at the path is already included in the intermediate file system structure 125, and the element includes one or more children elements. The one or more children elements of the element may be moved to a target path associated with the data object (e.g., symbolic link file) being added. The element may be mapped to the target path to add the new data object 150 to the intermediate file system structure 125.

The file system management component 118 may use the intermediate file system structure 125 to install the file system 124 storing the data objects 150 at their respective paths in non-volatile memory 123. In some embodiments, the file system management component 118 may install the file system 124 in one or more servers 112 in the cloud-based environment 110. Also, the intermediate file system structure 125 may be used to output a file system image that may be distributed to one or more servers 112 or computer systems 120 for installation. In addition to setting up a physical device, like computer system 120 or server 112, the file system manage component 118 may use the intermediate file system structure 125 to set up one or more virtual machines.

A host machine (e.g., computer system 120, server 112) may allocate a certain amount of its storage resources to a virtual machine. The virtual machine is then able to use the allocated storage resources to execute applications, including an operating system (referred to as guest operating systems) that implements a file system. Executable code that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

In some embodiments, after the file system 124 is installed, the file system management component 118 may reference the intermediate file system structure 125 any time an operation is requested to be performed on the data objects 150 in the file system 124 to determine whether elements need to be moved to preserve the data object paths and the symbolic links. Thus, the intermediate file system structure 125 may be used as a guide for operating on the data objects 150 in the file system 124 during operation of the computer system 120. Also, in some embodiments, the file system management component 118 may provide a notification when inconsistencies between paths due to symbolic links are identified between various data objects 150.

Figure 2:
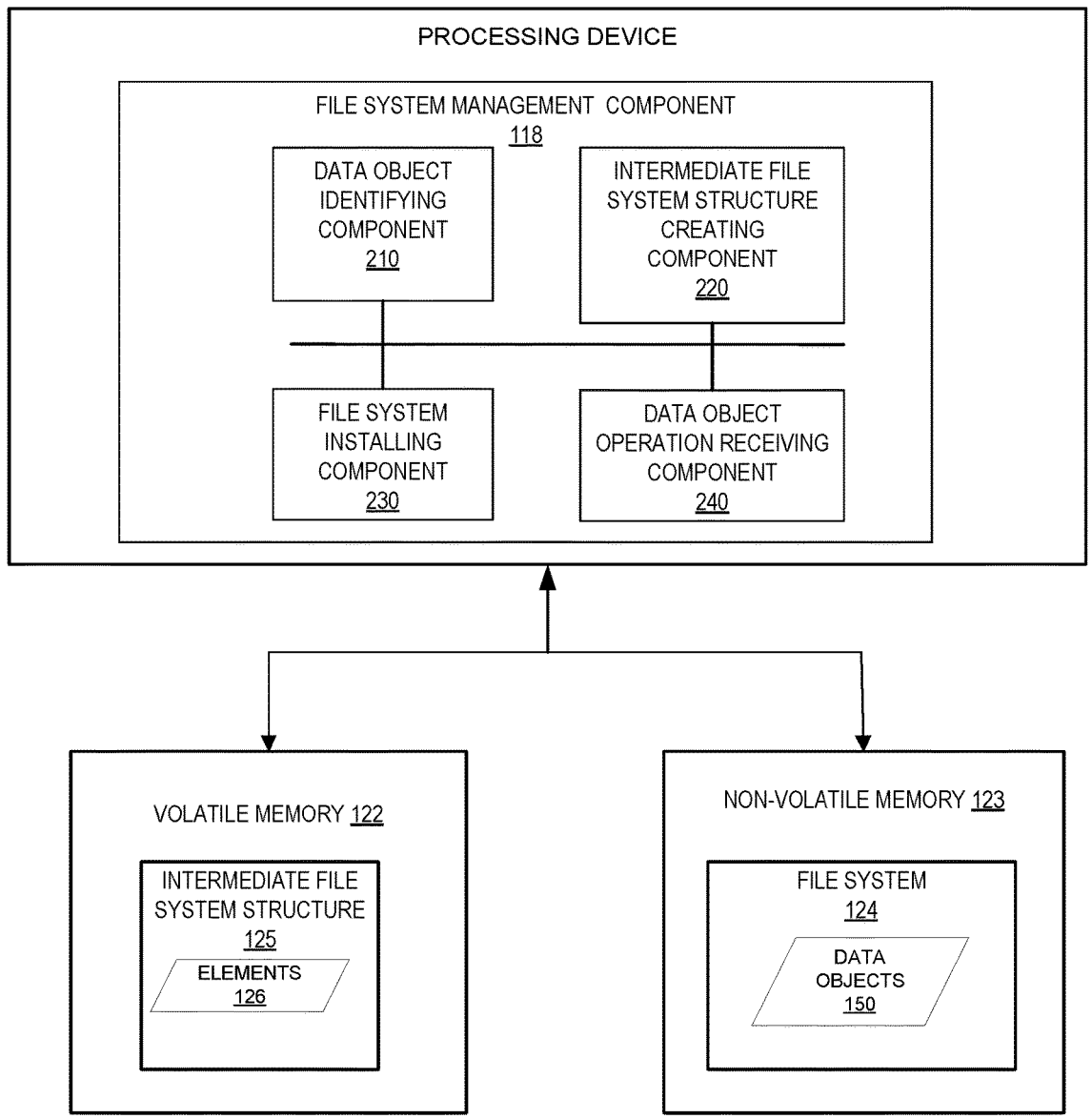
FIG. 2 depicts a block diagram of an example computer system, in accordance with one or more aspects of the present disclosure.

FIG. 2 depicts a block diagram of an example computer system 200, in accordance with one or more aspects of the present disclosure. Computer system 200 may be the same or similar to computing system 120 or server 112 of FIG. 1 and may include one or more processing devices and one or more memory devices. In the example shown, the processing device may execute the file system management component 118 that includes a data object identifying component 210, an intermediate file system structure creating component 220, a file system installing component 230, and a data object operation receiving component. Further, the file system management component 118 may access to the volatile memory 122 and/or the non-volatile memory 123. More or less components or modules may be included without loss of generality. For example, two or more of the components may be combined into a single component, or features of a component may be divided into two or more components. In one implementation, one or more of the components may reside on different computer systems (e.g., a client device and a server device).

The features discussed below in regards to some of the components (e.g., 210, 220, 230) may be executed by the file system management component 118 during a setup phase. The setup phase may occur at any point in time prior to the file system 124 being installed on the non-volatile memory 123 (e.g., during imaging of a new computer system 120). During the setup phase, the intermediate file system structure 125 may be created that includes elements 126 representing identified data objects 150 at their respective paths. Also, features discussed below in regards to some of the components (e.g., 240) may be executed by the file system management component 118 during an operation phase. The operation phase may occur after the file system 124 is successfully installed.

Data object identifying component 210 may enable a processing device to identify data objects 150 for a file system 124 to be installed on the computer system 210. The data objects 150 (e.g., non-symbolic link files, symbolic link files, directories) may be received from one or more servers 112 or media 160. The computer system 200 may not have a file system 124 installed when the data objects 150 are identified. The data objects 150 may be identified during the setup phase of the computer system 200. In some embodiments, after the file system 124 is installed, additional data objects 150 may be identified to be stored in the file system 124.

Intermediate file system structure creating component 220 may enable a processing device to create an intermediate file system structure 125 and store it in volatile memory 122, as depicted. The identified data objects 150 may be used to create the intermediate file system structure which represents each data object 150 as an element or node at a respective path. When a data object (e.g., non-symbolic link file or directory) is being added that includes a symbolic link as a portion of a path of the data object, the portion of the path may be replaced with a target path associated with the symbolic link. An element representing the data object may be added to the intermediate file system structure 125 at the path including the target link. When a data object (e.g., symbolic link file) is being added that includes a path that is a symbolic link and an element is already included in the intermediate file system structure 125 at the path, then any children elements of the element may be moved to a target path associated with the symbolic link. The element may be mapped to the target path. Moving children elements to the target path may enable adding data objects in any order regardless of whether the data objects are symbolic links files, non-symbolic link files, or directories.

File system installing component 230 may enable a processing device to install the file system 124 storing the data objects 150 in the non-volatile memory 123. The file system 124 may be installed using the intermediate file system structure 125 as a guide of the paths at which to store the data objects 150. The file system installing component 230 may store each data object 150 at the respective path of an element representing the data object in the intermediate file system structure 125 to install the file system 124

Data object operation receiving component 240 may enable a processing device to receive a request from an application to perform an operation on one or more of the data objects 150 in the file system 150. In some embodiments, the intermediate file system structure 125 may be referenced prior to executing the operation to determine whether any elements and paths need to be updated in the intermediate file system structure 125. For example, if the operation to be performed would cause a symbolic link to be moved to a new location, an element at the new location may already be included in the intermediate file system structure 125 and any children elements of the element may be moved to a target path associated with the symbolic link being moved. Updating the intermediate file system structure 125 in response to the operation may cause the associated data objects to be moved in the file system 124.

Figure 3:
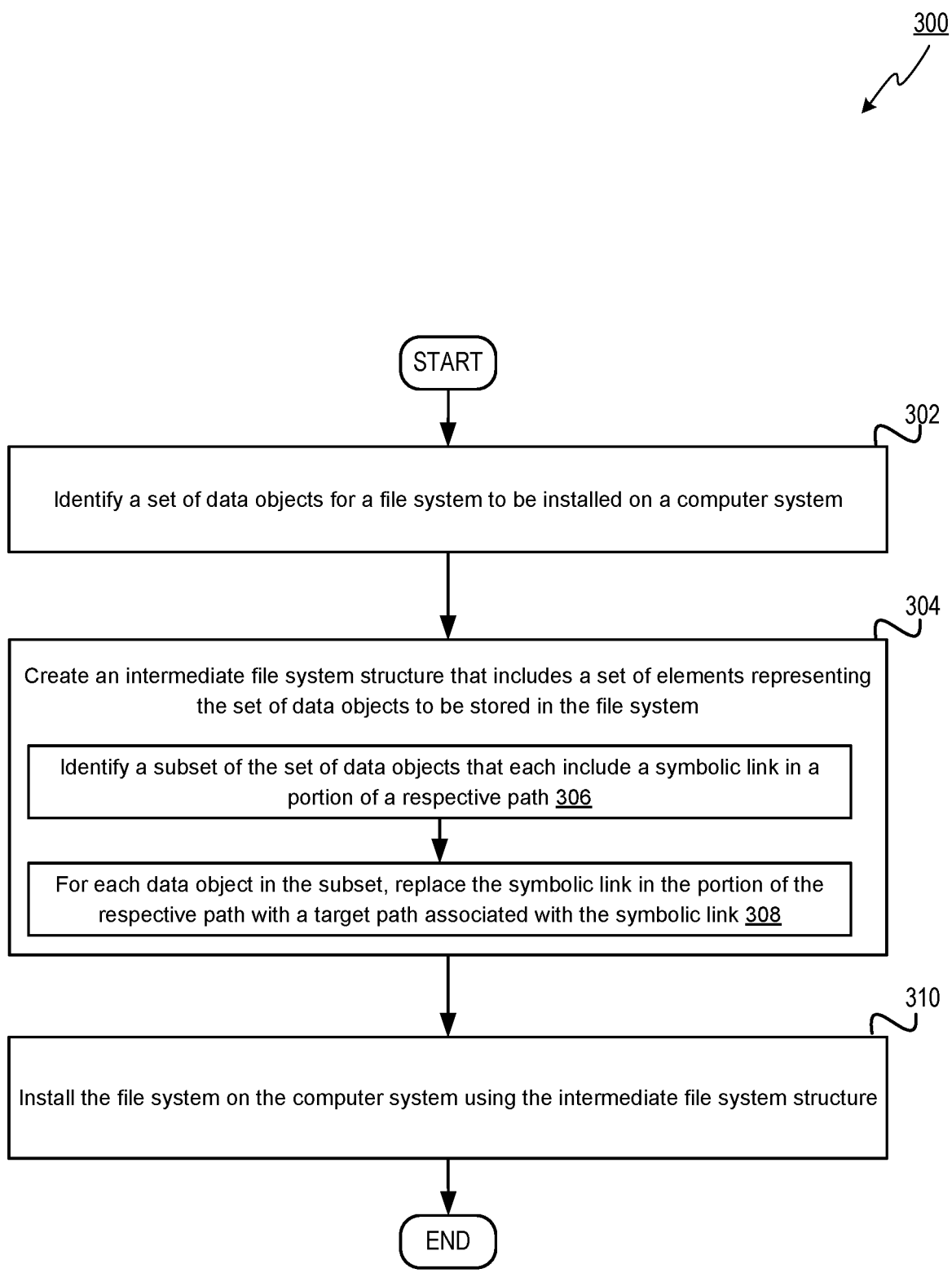
FIG. 3 depicts a flow diagram of an example method for creating an intermediate file system structure, in accordance with one or more aspects of the present disclosure.

FIG. 3 depicts a flow diagram of an example method 300 for creating an intermediate file system structure, in accordance with one or more aspects of the present disclosure. Method 300 and each of its individual functions, routines, subroutines, or operations may be performed by one or more processors of a computer device executing the method. In certain implementations, method 300 may be performed by a single processing thread of a guest operating system. Alternatively, method 300 may be performed by two or more processing threads executing on the computer device and each thread may execute one or more individual functions, routines, subroutines, or operations of the method. In an illustrative example, the processing threads implementing method 300 may be synchronized (e.g., using critical sections, semaphores, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computer systems. The term "article of manufacture," as used herein, is intended to encompass a computer program accessible from any computer-readable device or storage media. In one implementation, method 300 may be performed by a processing device executing the file system management component 118 and may begin at block 302.

At block 302, the processing device may identify a set of data objects for a file system to be installed on a computer system. The data objects may include file system data, such as non-symbolic link files, directories, and/or symbolic link files. The data objects may be included in one or more sets of content (e.g., archives, packages, and/or payloads) that are received by the processing device from any suitable source (e.g., server, media, etc.). In some embodiments, the data objects are identified during a setup phase prior to a file system being installed on the computer system. Additionally or alternatively, the data objects to be added to the file system may be identified during an operation phase after the file system is installed on the computer system (e.g., when a new file is to be stored in the file system).

At block 304, the processing device may create an intermediate file system structure that includes a set of elements representing the set of data objects to be stored in the file system. The intermediate file system structure may be of any suitable format (e.g., tree, linked list, graph) that enables moving elements in response to detection of certain conditions being satisfied (e.g., an element representing a certain data object (e.g., directory) already being present at a path of a data object (e.g., symbolic link file) that is to be added and the element including children elements). The intermediate file system structure may be stored in non-volatile memory and the file system may be installed in non-volatile memory of the computer system. Creating the intermediate file system structure may include various operations associated with ensuring that data objects (e.g., non-symbolic link files or directories) with paths that have portions including a symbolic link are stored at the target path of that symbolic link, as discussed further with regards to blocks 306 and 308.

At block 306, the processing device may identify a subset of the set of data objects that each include a symbolic link in a portion of a respective path. The subset of the set of data objects may be non-symbolic link files or directories. For example, a non-symbolic link file "sh" to be added may include a path "/bin/sh" and the portion "/bin" may be a symbolic link that points to "/usr/bin".

At block 308, the processing device may, for each data object in the subset, replace the symbolic link in the portion of the respective path with a target path associated with the symbolic link. For example, the portion "/bin" including the symbolic link may be replaced with the target path "/usr/bin" to create a new path "/usr/bin/sh". The new path can be used to add an element representing the data object to the intermediate file system structure. The new path of the element for the data object in the intermediate data structure may be used when installing the file system on the computer system.

Also, creating the intermediate file system structure may include various operations associated with ensuring that any conflicts are resolved when adding data objects (e.g., symbolic link files) having paths that are symbolic links to the intermediate file system structure when there are elements already present at those paths and the elements include children elements. For example, the processing device may identify a data object to be added to the file system that includes a symbolic link as the respective path. The symbolic link may point to a target path. The processing device may determine that an element at the path is already included in the intermediate file system structure and the element includes one or more children elements. As a result, the processing device may determine that adding the data object would cause an inconsistency. The processing device may provide a notification that indicates the inconsistency and that the inconsistency can be resolved by moving the one or more children elements of the element to the target path of the symbolic link.

In some embodiments, the processing device may move any children elements of the element to the target path in the intermediate file system structure. Moving any of the children elements of the element to the target path in the intermediate file system structure may include replacing a portion of a respective path of the children elements associated with the symbolic link with the target path in the intermediate file system structure. The processing device may add the symbolic link at the element by mapping the element to the target path in the intermediate file system structure.

Further, the processing device may move, based on the intermediate file system structure, any data objects represented by the children elements of the element to the target path in the file system. Moving any of the data objects represented by the children elements of the element to the target path in the file system may include replacing a portion of a respective path of the data objects associated with the target path in the file system in view of the intermediate file system structure.

At block 310, the processing device may install the file system on the computer system using the intermediate file system structure. The processing device may use the path of each element representing a data object in the intermediate file system structure to store the data object in the file system. Thus, the intermediate file system structure may be used as a guide to install data objects in the file system in a consistent manner without conflicts between paths and while preserving symbolic links.

After the file system is installed on the computer system, the processing device may receive an operation to be performed on one of the data objects in the file system. The processing device may determine, using the intermediate file system structure prior to executing the operation, whether to update the respective path of the data object based on the operation. For example, the operation may include moving a location of a symbolic link to another path. However, the other path may be occupied by another element representing a data object (e.g., a directory), and the element may include children element. Moving the symbolic link may require deleting that directory, which would cause an inconsistency because that element includes children elements. The conflict may be resolved by updating the intermediate file system structure to move children elements of the element representing the directory to a target path associated with the symbolic link and then mapping the element to the target path. The processing device can use the updated intermediate file system structure to move the data objects represented by the children elements to the target path in the file system and adding the symbolic link to the desired path.

Figure 4:
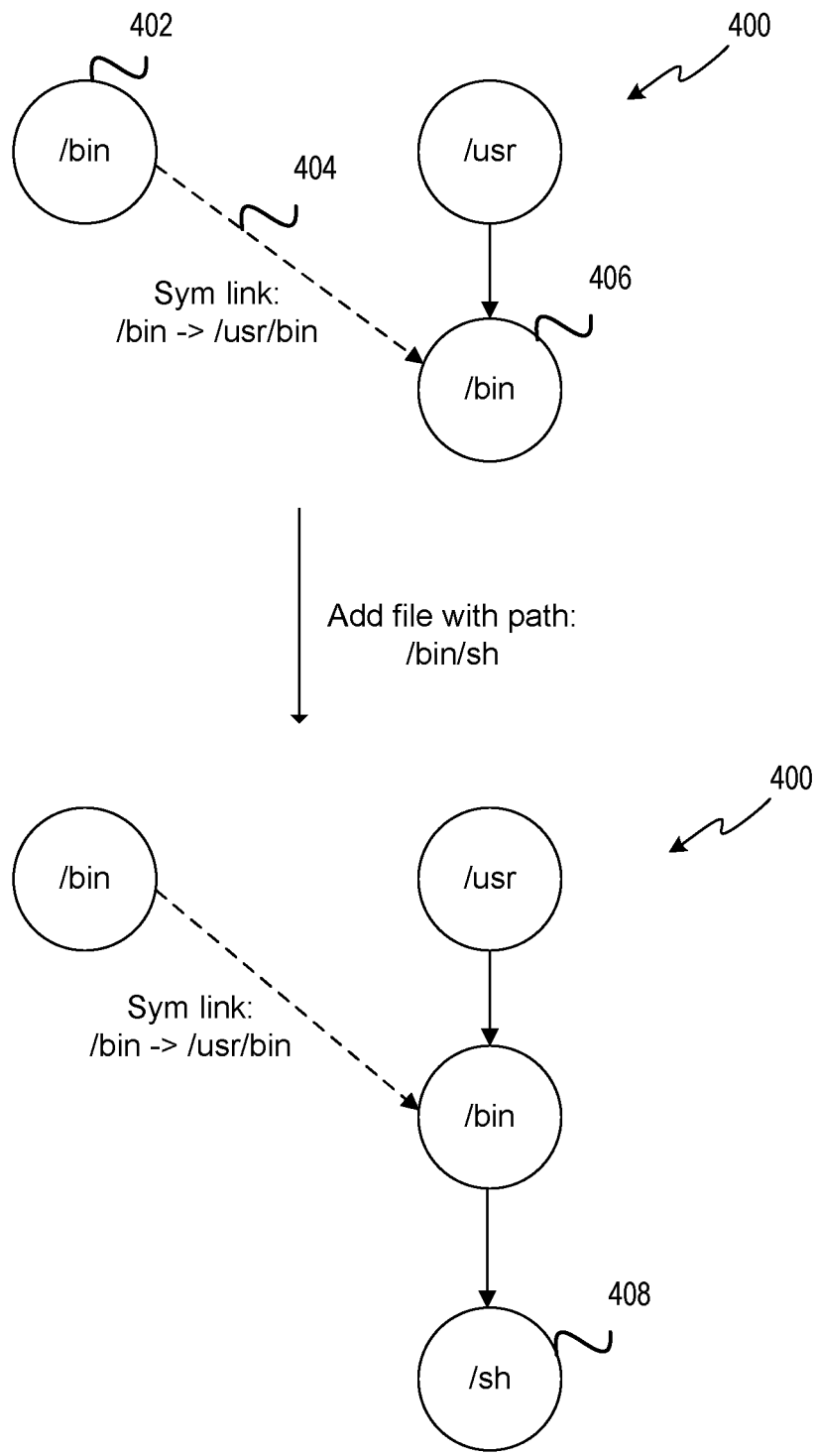
FIG. 4 illustrates an example of adding a file that includes a symbolic link in a portion of a path to an intermediate file system structure, in accordance with one or more aspects of the present disclosure.

FIG. 4 illustrates an example of adding a non-symbolic link file that includes a symbolic link in a portion of a path to an intermediate file system structure 400, in accordance with one or more aspects of the present disclosure. As depicted, the intermediate file system structure 400 includes an element 402 representing a data object (e.g., symbolic link file) with a path "/bin" that is a symbolic link 402. The symbolic link 402 points (represented by arrow 404) to element 406 at target path "/usr/bin". During creation of the intermediate file system structure 400, the non-symbolic link file "sh" may be identified to be stored in the file system. The non-symbolic link file "sh" may have a path "/bin/sh". The processing device may identify that a portion "/bin" of the path "/bin/sh" includes the symbolic link 402 "/bin". Accordingly, the processing device may replace the portion "/bin" with the target path "/usr/bin" to create a new path "/usr/bin/sh" for the non-symbolic link file. An element 408 representing the non-symbolic link file "sh" may be added to update intermediate file system structure 400 at the new path "/usr/bin/sh", as depicted. In some embodiments, the element 408 may be added during a setup phase prior to the file system being installed on the computer system. In some embodiments, the element 408 may be added to update the intermediate file system structure 400 after the file system is installed. The intermediate file system structure 400 may be stored in volatile memory.

Figure 5:
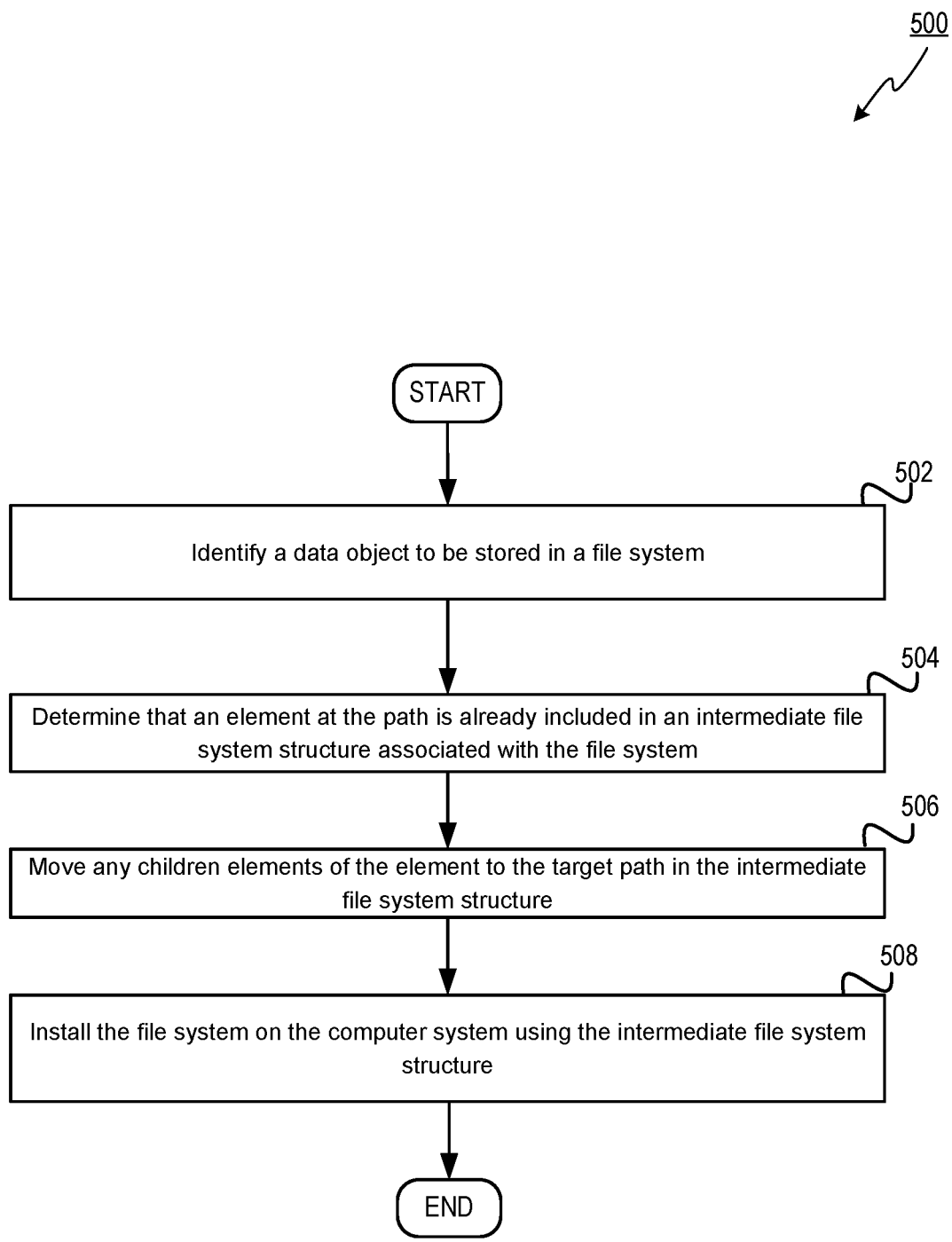
FIG. 5 depicts a flow diagram of an example method for adding a symbolic link to an intermediate data structure, in accordance with one or more aspects of the present disclosure.

FIG. 5 depicts a flow diagram of an example method 500 for adding a symbolic link to an intermediate data structure, in accordance with one or more aspects of the present disclosure. Method 500 may be similar to method 300 and may be performed in the same or a similar manner as described above in regards to FIG. 3. Method 500 may be performed by a processing device executing the file system management component 118 and may begin at block 502.

At block 502, the processing device may identify a data object (e.g., symbolic link file) to be stored in a file system. The data object includes a symbolic link as a path, and the symbolic link points to a target path. The data object may be included in a set of contents, such as an archive, payload, or package, to be used to install the file system. The processing device may identify the data object during a setup phase when an intermediate file system structure is being created. The intermediate file system structure may store a set of elements representing data objects to be stored in the file system, and the intermediate file system structure may be stored in volatile memory. In some embodiments, the processing device may identify the data object during an operation phase after the file system is installed (e.g., when a user attempts to add a new symbolic link to the installed file system).

At block 504, the processing device may determine that an element at the path is already included in the intermediate file system structure associated with the file system. Also, the element may include one or more children elements. For example, the element may represent a directory at path "/bin" and the data object to be added may have a path "/bin" that is a symbolic link. To add the symbolic link "/bin" to the intermediate file system structure may include deleting the directory "/bin". Deleting the directory "/bin" may cause an inconsistency because the directory includes one or more children elements representing one or more data objects.

Thus, at block 506, the processing device may move any children elements of the element to the target path associated with the symbolic link in the intermediate file system structure. The processing device may move the children elements by replacing a portion of the respective paths of the children elements that include the symbolic link with the target path in the intermediate file system structure. The processing device may add the symbolic link at the element by mapping the element to the target path in the intermediate file system structure.

Further, prior to installing the file system, the processing device may identify another data object to be stored in the file system. The other data object (e.g., non-symbolic link file or directory) may include the symbolic link in a portion of a path. The processing device may replace the symbolic link in the portion of the path with the target path associated with the symbolic link to create a new path. The processing device may add an element representing the other data object to the intermediate file system structure at the new path.

In some embodiments, the processing device may receive an additional data object (e.g., symbolic link file) to be stored in the file system. A path of the additional data object may be a symbolic link that is mapped to a second target path. The processing device may compare the additional data object to the intermediate file system structure to determine whether the path of the additional data object would cause an inconsistency by replacing an element of the intermediate file system structure that includes a child element with the symbolic link. The processing device may provide a notification that indicates the inconsistency and that the inconsistency can be resolved by moving the child element of the element to the target path in the intermediate file system structure.

At block 508, the processing device may install the file system on the computer system in non-volatile memory using the intermediate file system structure. The processing device may use the intermediate file system structure as a guide to install the data objects at their respective paths associated with the elements that represent the data objects in the intermediate file system structure. After the file system is installed, the processing device may receive an operation to be performed on the data object in the file system. The processing device may determine, using the intermediate file system structure prior to executing the operation, whether to update the path of the data objects based on the operation.

Figure 6:
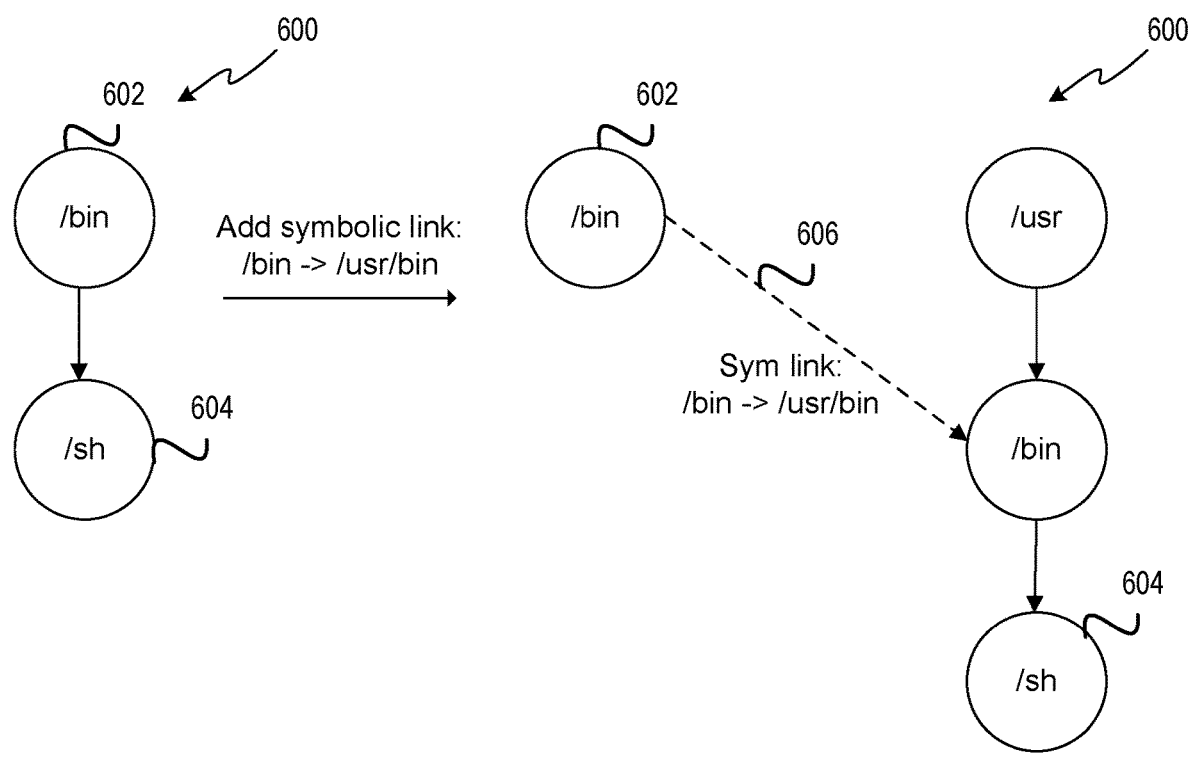
FIG. 6 illustrates an example of adding a symbolic link to an intermediate file system structure, in accordance with one or more aspects of the present disclosure.

FIG. 6 illustrates an example of adding a symbolic link to an intermediate file system structure 600, in accordance with one or more aspects of the present disclosure. As depicted, the intermediate file system structure 600 includes an element 602 representing a directory "bin" at path "/bin". The directory "bin" has one child element 604 that represents a file "sh" stored in the "bin" directory. Elements 602 and 604 may be added by various data objects included in a set of content that does not include a symbolic link associated with the path "/bin".

During the setup phase or the operation phase, a data object (e.g., symbolic link file) may be identified to be added to the file system and the data object may include the path "/bin" that is a symbolic link. In conventional systems, an error may be thrown because the path "/bin" is already created for directory "bin" and the directory is storing a file "sh". In some embodiments of the present disclosure, any children elements of an element at the path to add the symbolic link may be moved to the target path associated with the symbolic link. In the depicted example, the symbolic link "/bin" to be added points to the target path "/usr/bin". As such, the processing device may move the element 604 representing the file "sh" to the target path "/usr/bin" (file "sh" now has path "/usr/bin/sh"), as shown in the intermediate file system structure 600 that is updated. Further, the processing device may add the symbolic link to the element 602 by mapping (represented by arrow 606) the element 602 to the target path "/usr/bin" in the intermediate file system structure 600 that is updated.

Figure 7:
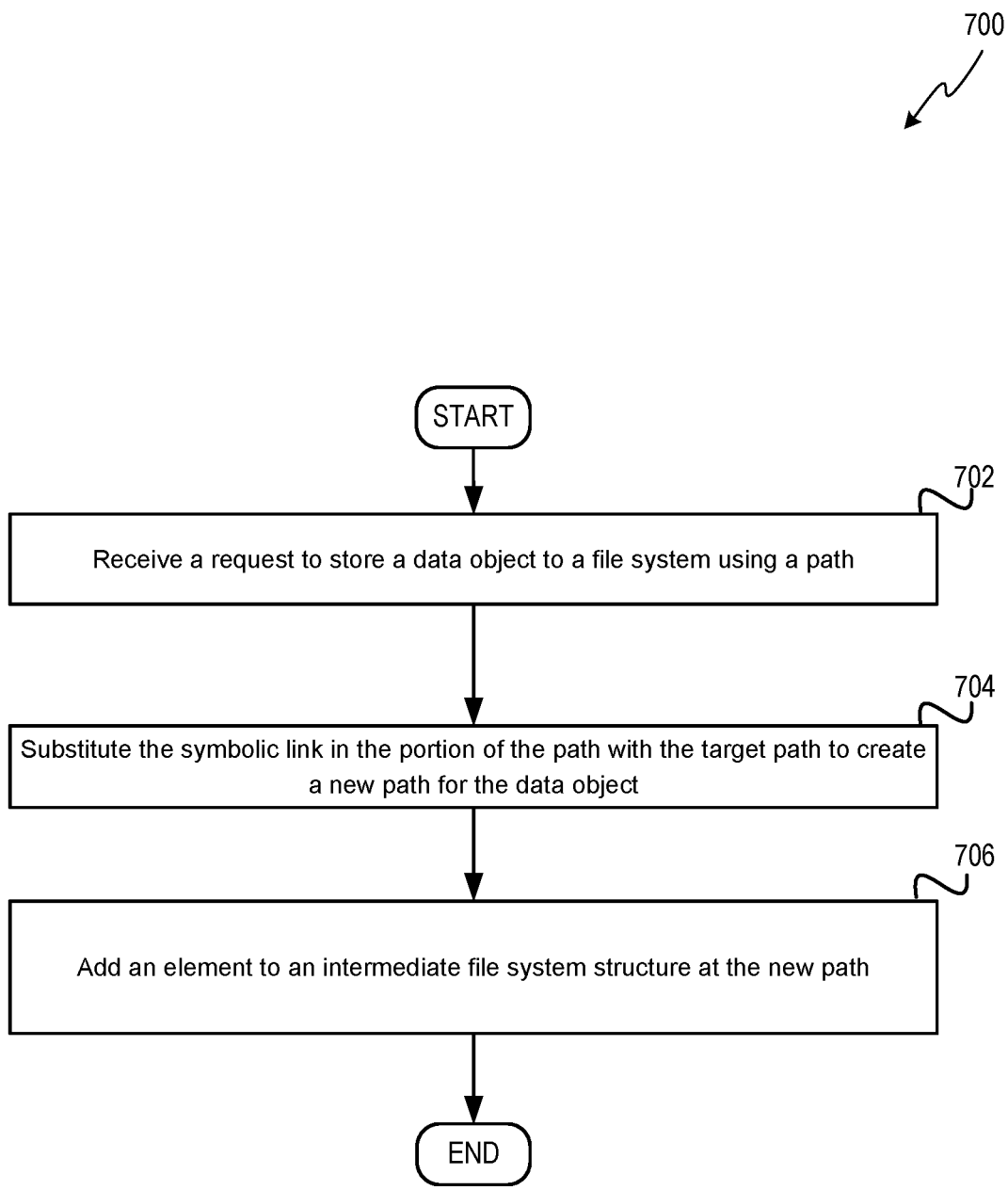
FIG. 7 depicts a flow diagram of an example method for using an intermediate file system structure to handle a data object request, in accordance with one or more aspects of the present disclosure.

FIG. 7 depicts a flow diagram of an example method 700 for using an intermediate file system structure to handle a data object request, in accordance with one or more aspects of the present disclosure. Method 700 may be similar to method 300 and may be performed in the same or a similar manner as described above in regards to FIG. 3. Method 700 may be performed by a processing device executing the file system management component 118 and may begin at block 702.

At block 702, the processing device may receive a request to store a data object to a file system using a path. A portion of the path may include a symbolic link pointing to a target path. For example, the path may be "/bin/sh" and the portion "/bin" may be a symbolic link that points to target path "/usr/bin". The data object may be received during an operation phase after the file system is installed on the computer system. The intermediate file system structure may be created during a setup phase prior to the file system being installed. The intermediate file system structure may include elements representing data objects to be stored in the file system and may be used as a guide to install the data objects in the file system. The intermediate file system may be stored in volatile memory, and the file system may be stored in non-volatile memory.

At block 704, the processing device may substitute the symbolic link in the portion of the path with the target path to create a new path for the data object. For example, the processing device may substitute the portion "/bin" with the target path "/usr/bin" to create the new path "/usr/bin/sh".

At block 706, the processing device may add an element to an intermediate file system structure at the new path. Once the element is added, the processing device may use the updated intermediate file system structure to store the data object at the new path in the file structure.

In some embodiments, the processing device may receive a request to store a second data object to the file system. The second data object may include a second symbolic link as a second path, and the second symbolic link points to a second target path. The processing device may determine that a second element having the second path is already included in the intermediate file system structure. The processing device may move any children elements of the second element to the second target path in the intermediate file system structure. Further, the processing device may add the second symbolic link at the second element by mapping the second element to the second target path in the intermediate file system structure. The processing device may use the updated intermediate file system structure to move data objects represented by the children elements to the target path in the file system, and to add the symbolic link to the second path in the file system, which may include deleting the previous data object (e.g., directory) after moving the data objects represented by the children elements.

Figure 8:
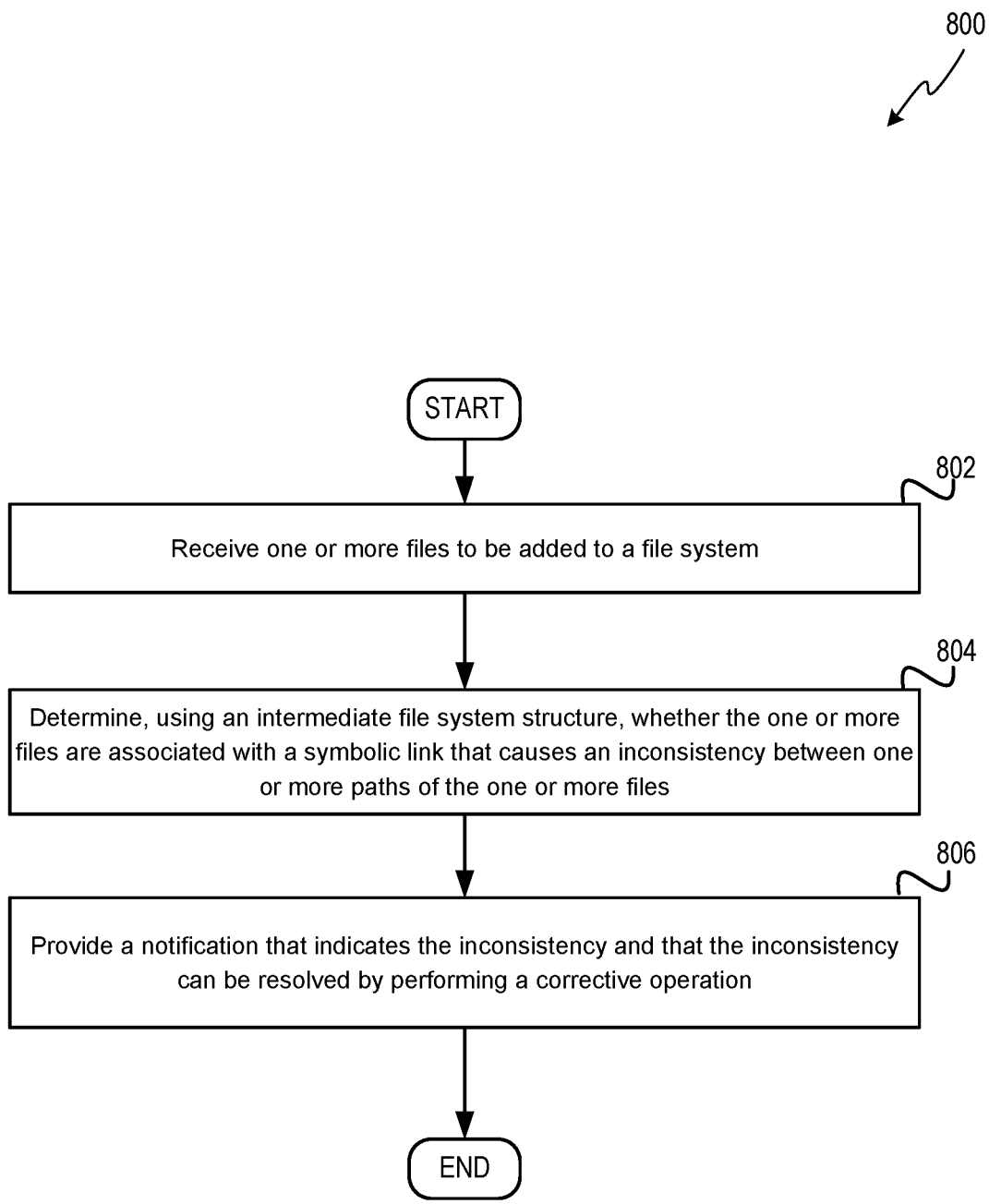
FIG. 8 depicts a flow diagram of an example method for using an intermediate file system structure to determine whether one or more files associated with a symbolic link cause an inconsistency between one or more paths, in accordance with one or more aspects of the present disclosure.

FIG. 8 depicts a flow diagram of an example method 800 for using an intermediate file system structure to determine whether one or more files associated with a symbolic link cause an inconsistency between one or more paths, in accordance with one or more aspects of the present disclosure. Method 800 may be similar to method 300 and may be performed in the same or a similar manner as described above in regards to FIG. 3. Method 800 may be performed by a processing device executing the file system management component 118 and may begin at block 802.

At block 802, the processing device may receive one or more data objects to be added to a file system. The data objects may be included in a set of content (e.g., archive, payload, package) that include file system data. The data objects may be non-symbolic link files, symbolic link files, directories, or the like. The one or more data objects may be received prior to installing a file system or after a file system is already installed on a computer system.

At block 804, the processing device may determine, using the intermediate file system structure, whether the one or more data objects are associated with a symbolic link that will cause an inconsistency between one or more paths of the one or more data objects. One inconsistency may include storing a data object at a path that includes a symbolic link instead of at a target path associated with the symbolic link. Another inconsistency may include attempting to add a data object that includes a path that is a symbolic link when there is already another element including a child element having that path included in an intermediate file system structure.

At block 806, the processing device may provide a notification that indicates the inconsistency and that the inconsistency can be resolved by performing a corrective action. In some embodiments, the processing device may perform the corrective action to attempt to correct the inconsistency between the one or more paths of the one or more data objects. In some embodiments, the processing may perform the corrective action by substituting a portion of a respective path of the one or more paths with a target path associated with the symbolic link. In some embodiments, the processing device may move any children elements of one or more elements in the intermediate file system structure that are to be replaced by the symbolic link to the target path associated with the symbolic link in the intermediate file system structure. The processing device may provide another notification indicating whether the corrective action was successful or not.

Figure 9:
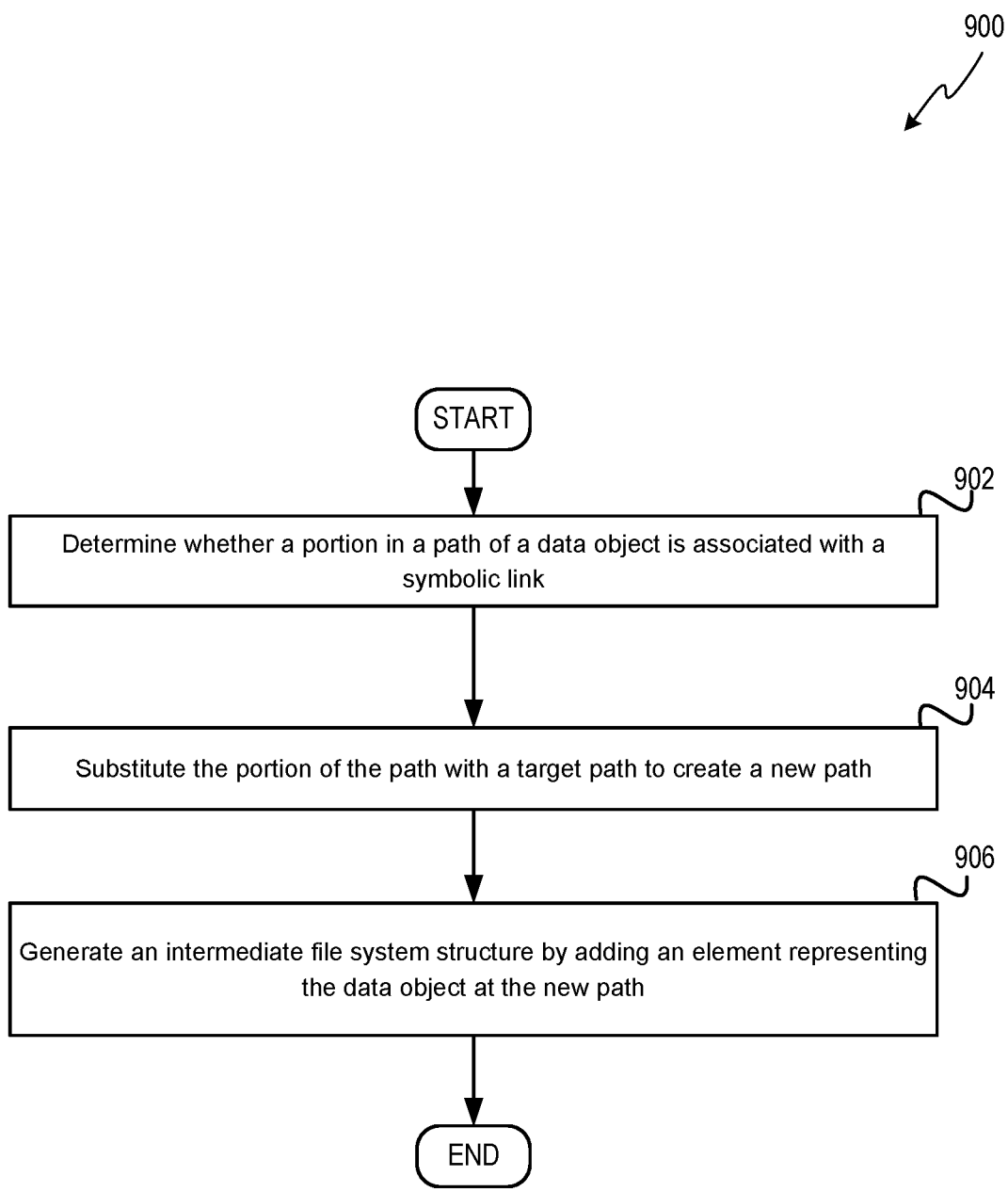
FIG. 9 depicts a flow diagram of another example method for generating an intermediate file system structure, in accordance with one or more aspects of the present disclosure.

FIG. 9 depicts a flow diagram of another example method 900 for generating an intermediate file system structure, in accordance with one or more aspects of the present disclosure. Method 900 may be similar to method 300 and may be performed in the same or a similar manner as described above in regards to FIG. 3. Method 900 may be performed by a processing device executing the file system management component 118 and may begin at block 902.

At block 902, the processing device may determine whether a portion in a path of a data object is associated with a symbolic link. The symbolic link is mapped to a target path. The data object may be identified to be stored in a file system prior to the file system being installed on a computer system. At block 904, the processing device may substitute the portion of the path with the target path to create a new path.

At block 906, the processing device may generate an intermediate file system structure by adding an element representing the data object at the new path. The intermediate file system structure may be generated in volatile memory of the computer system prior to the file system being installed. The processing device may use the intermediate file system structure as a guide when storing the data object to the file system to install the file system. For example, the path associated with the element in the intermediate file systems structure may be used as the path to store the data object in the file system in non-volatile memory.

In some embodiments, generating the intermediate file system structure may also include determining whether a path of a data object is a symbolic link. For example, "/bin" may be the path of the data object and it may be a symbolic link mapped to a target path "/usr/bin". The processing device may identify an element at the path already included in the intermediate file system structure and move any children elements of the element to the target path of the symbolic link. The processing device may map the element to the target path.

In some embodiments, the processing device may install the file system using the intermediate file system structure. The processing device may receive an operation to be performed on the data object in the file system. The operation may be a read, write, or erase operation. The processing device may determine, using the intermediate file system structure prior to executing the operation, whether to update the path of the data object in intermediate file system structure based on the operation.

Figure 10:
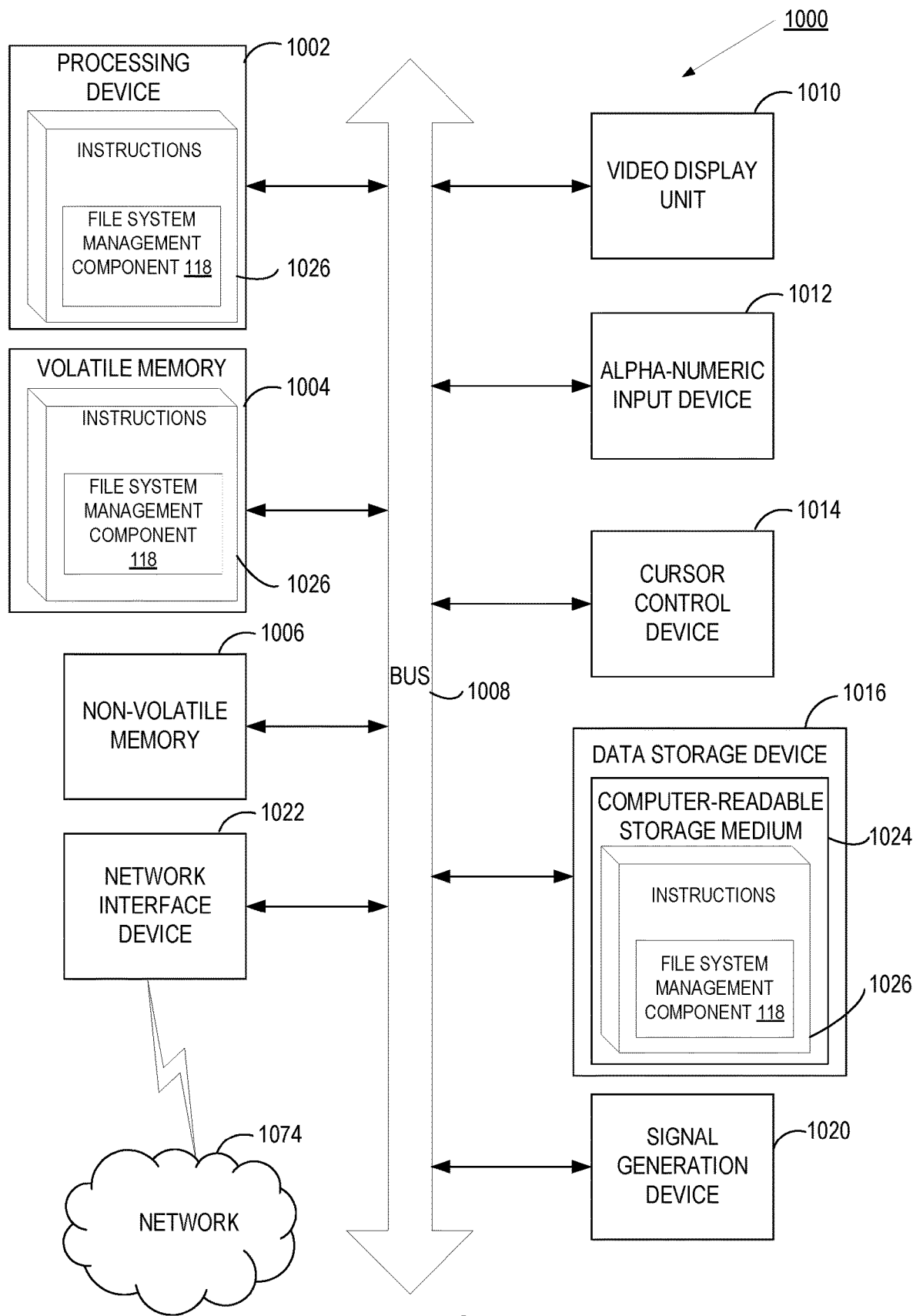
FIG. 10 depicts a block diagram of an illustrative computing device operating in accordance with the examples of the present disclosure.

FIG. 10 depicts a block diagram of a computer system operating in accordance with one or more aspects of the present disclosure. In various illustrative examples, computer system 1000 may correspond to computer system 120 of FIG. 1, the server 112 of FIG. 1, or the computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alpha-numeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 300, 500, 700, 800, and/or 900 and for the file system management component 118.

Instructions 1026 may also reside, completely or partially, within volatile memory 1004 and/or within processing device 1002 during execution thereof by computer system 1000, hence, volatile memory 1004, and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method, comprising: identifying a plurality of data objects for a file system to be installed on a computer system, wherein each of the plurality of data objects is to be stored in the file system using a respective path; creating an intermediate file system structure that includes a plurality of elements representing the plurality of data objects to be stored in the file system, each of the plurality of elements being placed in the intermediate file system structure at the respective path, wherein creating the intermediate file system structure comprises: identifying a subset of the plurality of data objects that each include a symbolic link in a portion of the respective path; and for each data object in the subset, replacing the symbolic link in the portion of the respective path with a target path associated with the symbolic link; and installing the file system on the computer system using the intermediate file system structure.

Example 2 is the method of Example 1, wherein creating the intermediate file system structure further comprises: identifying a data object of the plurality of data objects that includes a second symbolic link as the respective path, wherein the second symbolic link points to a second target path; determining that an element representing the data object is already included in the intermediate file system structure; moving any children elements of the element to the second target path in the intermediate file system structure; and moving, based on the intermediate file system structure, any data objects represented by the children elements of the element to the second target path in the file system.

Example 3 is the method of Example 2, further comprising: adding the second symbolic link at the element by mapping the element to the target path in the intermediate file system structure.

Example 4 is the method of Example 2, wherein: moving any of the children elements of the element to the second target path in the intermediate file system structure further comprises replacing a portion of a respective path of the children elements associated with the symbolic link with the second target path in the intermediate file system structure; and moving any of the data objects represented by the children elements of the element to the second target path in the file system further comprises replacing a portion of a respective path of the data objects associated with the second target path in the file system.

Example 5 is the method of Example 1, wherein: creating the intermediate file system structure further comprises creating the intermediate file system structure in volatile memory; and installing the file system further comprises installing the file system in non-volatile memory.

Example 6 is the method of Example 1, further comprising: receiving an operation to be performed on one of the plurality of data objects in the file system; and determining, using the intermediate file system structure prior to executing the operation, whether to update the respective path of the one of the plurality of data objects based on the operation.

Example 7 is the method of Example 1, further comprising: receiving an additional data object to be stored in the file system, wherein a path of the additional data object is a symbolic link that is mapped to a second target path; comparing the additional data object to the intermediate file system structure to determine whether the path of the additional data object would cause an inconsistency comprising replacing one of the plurality of elements that includes a child element with the symbolic link; and providing a notification that indicates the inconsistency and that the inconsistency can be resolved by moving the child element of the one of the plurality of elements to the target path.

Example 8 is the method of Example 1, wherein the intermediate file system structure comprises a tree and the plurality of elements comprise a plurality of nodes in the tree.

Example 9 is the method of Example 1, wherein the plurality of data objects comprise file system data including at least one of binary files, source code files, or symbolic link files.

Example 10 is a system, comprising: a memory device; a processing device operatively coupled to the memory device, the processing device to: identify a data object to be stored in a file system, wherein the data object includes a symbolic link as a path, and the symbolic link points to a target path; determine that an element representing the data object is already included in an intermediate file system structure associated with the file system; move any children elements of the element to the target path in the intermediate file system structure; and install the file system on the computer system using the intermediate file system structure.

Example 11 is the system of Example 10, wherein the processing device is further to add the symbolic link at the element by mapping the element to the target path in the intermediate file system structure.

Example 12 is the system of Example 10, wherein, prior to installing the file system, the processing device is further to: identify another data object to be stored in the file system, wherein the another data object includes the symbolic link in a portion of a path; replace the symbolic link in the portion of the path with the target path associated with the symbolic link; and add an element representing the another data object to the intermediate file system structure.

Example 13 is the system of Example 10, wherein the intermediate file system structure is stored in volatile memory, and the file system is stored in non-volatile memory.

Example 14 is the system of Example 10, wherein the processing device is further to: receive an operation to be performed on the data object in the file system; and determine, using the intermediate file system structure prior to executing the operation, whether to update the path of the data objects based on the operation.

Example 15 is the system of Example 10, wherein the processing device is further to: receive an additional data object to be stored in the file system, wherein a path of the additional data object is a symbolic link that is mapped to a second target path; compare the additional data object to the intermediate file system structure to determine whether the path of the additional data object would cause an inconsistency comprising replacing an element of the intermediate file system structure that includes a child element with the symbolic link; and provide a notification that indicates the inconsistency and that the inconsistency can be resolved by moving the child element of the element to the target path in the intermediate file system structure.

Example 16 is the system of Example 10, wherein the intermediate file system structure comprises a tree and the data object comprises a symbolic link file.

Example 17 is a non-transitory, computer-readable medium storing instructions that, when executed, cause a processing device to: receive a request to store a data object to a file system using a path, wherein a portion of the path includes a symbolic link pointing to a target path; substitute the symbolic link in the portion of the path with the target path to create a new path for the data object; and add an element to an intermediate file system structure at the new path, wherein the intermediate file system structure is to be used to store the data object in the file system using the new path.

Example 18 is the computer-readable medium of Example 17, wherein the intermediate file system structure is stored in volatile memory, and the file system is stored in non-volatile memory.

Example 19 is the computer-readable medium of claim 17, wherein the processing device is further to: receive a request to store a second data object to the file system, wherein the second data object includes a second symbolic link as a second path, and the second symbolic link points to a second target path; determine that a second element having the second path is already included in the intermediate file system structure; and move any children elements of the second element to the second target path in the intermediate file system structure.

Example 20 is the computer-readable medium of Example 19, wherein the processing device is further to add the second symbolic link at the second element by mapping the second element to the second target path in the intermediate file system structure.

Example 21 is a system, comprising: a memory device; a processing device operatively coupled to the memory device, the processing device to: receive one or more data objects to be added to a file system; determine, using an intermediate file system structure, whether the one or more data objects are associated with a symbolic link that will cause an inconsistency between one or more paths of the one or more data objects; and providing a notification that indicates the inconsistency and that the inconsistency can be resolved by performing a corrective operation.

Example 22 is the system of Example 21, wherein to perform the corrective operation, the processing device is further to substitute a portion of a respective path of the one or more paths with a target path associated with the symbolic link.

Example 23 is the system of Example 21, wherein to perform the corrective operation, the processing device is further to move any children elements of one or more elements in the intermediate file system structure that are to be replaced by the symbolic link to a target path associated with the symbolic link in the intermediate file system structure.

Example 24 is the system of Example 21, wherein the processing device is further to perform the corrective action to attempt to correct the inconsistency between the one or more paths of the one or more data objects.

Example 25 is the system of Example 24, wherein the processing device is further to provide a second notification indicating whether the inconsistency is corrected.

Example 26 is the system of Example 21, wherein the intermediate file system structure is stored in volatile memory.

Example 27 is an apparatus comprising: a means for determining whether a portion in a path of a data object is associated with a symbolic link, wherein the symbolic link is mapped to a target path; a means for substituting the portion of the path with the target path to create a new path; and a means for generating an intermediate file system structure by adding an element representing the data object at the new path.

Example 28 is the apparatus of Example 27, wherein the intermediate file system structure is stored in volatile memory.

Example 29 is the apparatus of Example 27, further comprising a means for installing the file structure on a computer system using the intermediate file system structure.

Example 30 is the apparatus of Example 29, further comprising: a means for receiving an operation to be performed on the data object in the file system; and a means for determining, using the intermediate file system structure prior to executing the operation, whether to update the path of the data object based on the operation.

What is claimed is:

1. A method, comprising:
   identifying a plurality of data objects for a file system to be installed on a computer system, wherein each of the plurality of data objects is to be stored in the file system using a respective path;
   creating an intermediate file system structure that includes a plurality of elements representing the plurality of data objects to be stored in the file system, each of the plurality of elements being placed in the intermediate file system structure at the respective path, wherein creating the intermediate file system structure comprises:
  identifying a data object of the plurality of data objects, wherein the identified data object includes a symbolic link as the respective path, wherein the symbolic link points to a target path;
  determining that an element representing the data object is already included in the intermediate file system structure at an existing element path in the intermediate file system structure, and the element has one or more children elements;
  moving the children elements of the element from the existing element path in the intermediate file system structure to the target path in the intermediate file system structure; and
installing the file system on the computer system using the intermediate file system structure.

2. The method of claim 1, wherein creating the intermediate file system structure further comprises:
  moving, based on the intermediate file system structure, any data objects represented by the children elements of the element to the target path in the file system;
  identifying a subset of the plurality of data objects that each include a second symbolic link in a portion of the respective path; and
  for each data object in the subset, replacing the second symbolic link in the portion of the respective path with a second target path associated with the second symbolic link.

3. The method of claim 2, further comprising:
adding the second symbolic link at the element by mapping the element to the target path in the intermediate file system structure.

4. The method of claim 1, wherein:
moving any of the children elements of the element to the target path in the intermediate file system structure further comprises replacing a portion of a respective path of the children elements associated with the symbolic link with the target path in the intermediate file system structure; and
moving any of the data objects represented by the children elements of the element to the target path in the file system further comprises replacing a portion of a respective path of the data objects associated with the target path in the file system.

5. The method of claim 1, wherein:
creating the intermediate file system structure further comprises creating the intermediate file system structure in volatile memory; and
installing the file system further comprises installing the file system in non-volatile memory.

6. The method of claim 1, further comprising:
receiving an operation to be performed on one of the plurality of data objects in the file system; and
determining, using the intermediate file system structure prior to executing the operation, whether to update the respective path of the one of the plurality of data objects based on the operation.

7. The method of claim 1, further comprising:
receiving an additional data object to be stored in the file system, wherein a path of the additional data object is a symbolic link that is mapped to a second target path;
comparing the additional data object to the intermediate file system structure to determine whether the path of the additional data object would cause an inconsistency comprising replacing one of the plurality of elements that includes a child element with the symbolic link; and
providing a notification that indicates the inconsistency and that the inconsistency can be resolved by moving the child element of the one of the plurality of elements to the target path.

8. The method of claim 1, wherein the intermediate file system structure comprises a tree and the plurality of elements comprise a plurality of nodes in the tree.

9. The method of claim 1, wherein the plurality of data objects comprise file system data including at least one of binary files, source code files, or symbolic link files.

10. A system, comprising:
  a memory device;
  a processing device operatively coupled to the memory device, the processing device to:
    identify a data object to be stored in a file system, wherein the data object includes a symbolic link as a path, and the symbolic link points to a target path;
    determine that an element representing the data object is already included in an intermediate file system structure at an existing element path in the intermediate file system structure, and the element has one or more children elements, wherein the intermediate file system structure is associated with the file system;
    move the children elements of the element from the existing element path in the intermediate file system structure to the target path in the intermediate file system structure; and
    install the file system on a computer system using the intermediate file system structure.

11. The system of claim 10, wherein the processing device is further to add the symbolic link at the element by mapping the element to the target path in the intermediate file system structure.

12. The system of claim 10, wherein, prior to installing the file system, the processing device is further to:
  identify another data object to be stored in the file system, wherein the another data object includes the symbolic link in a portion of a path;
  replace the symbolic link in the portion of the path with the target path associated with the symbolic link; and
  add an element representing the another data object to the intermediate file system structure.

13. The system of claim 10, wherein the intermediate file system structure is stored in volatile memory, and the file system is stored in non-volatile memory.

14. The system of claim 10, wherein the processing device is further to:
  receive an operation to be performed on the data object in the file system; and
  determine, using the intermediate file system structure prior to executing the operation, whether to update the path of the data objects based on the operation.

15. The system of claim 10, wherein the processing device is further to:
  receive an additional data object to be stored in the file system, wherein a path of the additional data object is a symbolic link that is mapped to a second target path;
  compare the additional data object to the intermediate file system structure to determine whether the path of the additional data object would cause an inconsistency comprising replacing an element of the intermediate file system structure that includes a child element with the symbolic link; and provide a notification that indicates the inconsistency and that the inconsistency can be resolved by moving the child element of the element to the target path in the intermediate file system structure.

16. The system of claim 10, wherein the intermediate file system structure comprises a tree and the data object comprises a symbolic link file.

17. A non-transitory, computer-readable medium storing instructions that, when executed, cause a processing device to:
  identify a data object to be stored in a file system, wherein the data object includes a symbolic link as a path, and the symbolic link points to a target path;
  determine that an element representing the data object is already included in an intermediate file system structure at an existing element path in the intermediate file system structure, and the element has one or more children elements, wherein the intermediate file system structure is associated with the file system;
  move the children elements of the element from the existing element path in the intermediate file system structure to the target path in the intermediate file system structure; and
  install the file system on a computer system using the intermediate file system structure.

18. The computer-readable medium of claim 17, wherein the intermediate file system structure is stored in volatile memory, and the file system is stored in non-volatile memory.

19. The computer-readable medium of claim 17, wherein the processing device is further to:
  receive a request to store a second data object to a file system using a second path, wherein a portion of the second path includes a second symbolic link pointing to a second target path;
  substitute the second symbolic link in the portion of the second path with the second target path to create a new path for the second data object; and
  add an element to an intermediate file system structure at the new path, wherein the intermediate file system structure is to be used to store the second data object in the file system using the new path.

20. The computer-readable medium of claim 17, wherein the processing device is further to add the symbolic link at the element by mapping the element to the target path in the intermediate file system structure.

* * * * *